United States Patent

[11] 3,598,347

| [72] | Inventor | Lloyd J. Marburger<br>Peoria, Ill. |
|---|---|---|
| [21] | Appl. No. | 864,356 |
| [22] | Filed | Oct. 7, 1969 |
| [45] | Patented | Aug. 10, 1971 |
| [73] | Assignee | Caterpillar Tractor Co.<br>Peoria, Ill. |

[54] APPARATUS FOR SUPPORTING AND POSITIONING PIPE WELDERS
1 Claim, 2 Drawing Figs.

[52] U.S. Cl................................................. 248/2,
212/8 R, 212/35 R, 214/1 PA, 248/284
[51] Int. Cl......................................................... B66c 23/54

[50] Field of Search............................................. 248/2, 16,
284; 219/158, 59; 254/132; 212/8 R, 59, 35 R;
214/1 PA, 147, 1 CM

[56] References Cited
UNITED STATES PATENTS

| 2,702,137 | 2/1955 | Ives | 214/147 |
| 2,983,482 | 5/1961 | Cary | 214/3 X |
| 3,236,391 | 2/1966 | Kennedy | 212/35 X |

*Primary Examiner*—J. Franklin Foss
*Attorney*—Tjensvold, Feix, Phillips & Lempio Fryer ABSTRACT: A tractor-mounted support for a pipe-welding device which comprises a boom on the tractor, a frame supported by the boom and supporting the welder and adjusting means between the boom and the frame to position the welder precisely with respect to the pipe to be welded.

PATENTED AUG 10 1971 3,598,347
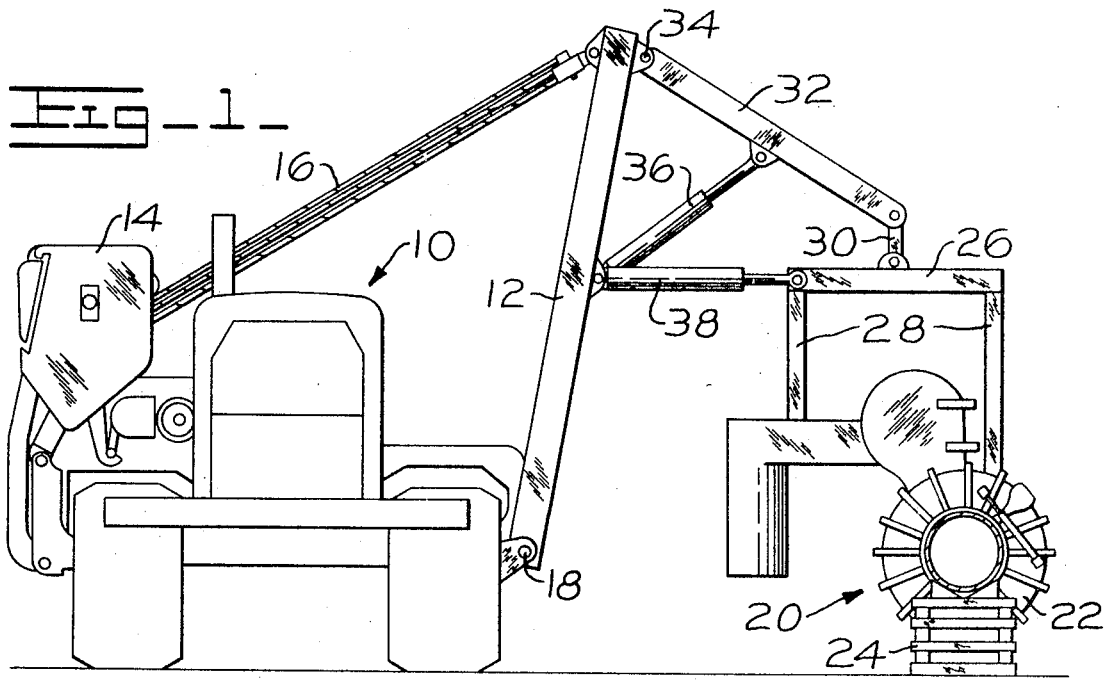
Fig_1_
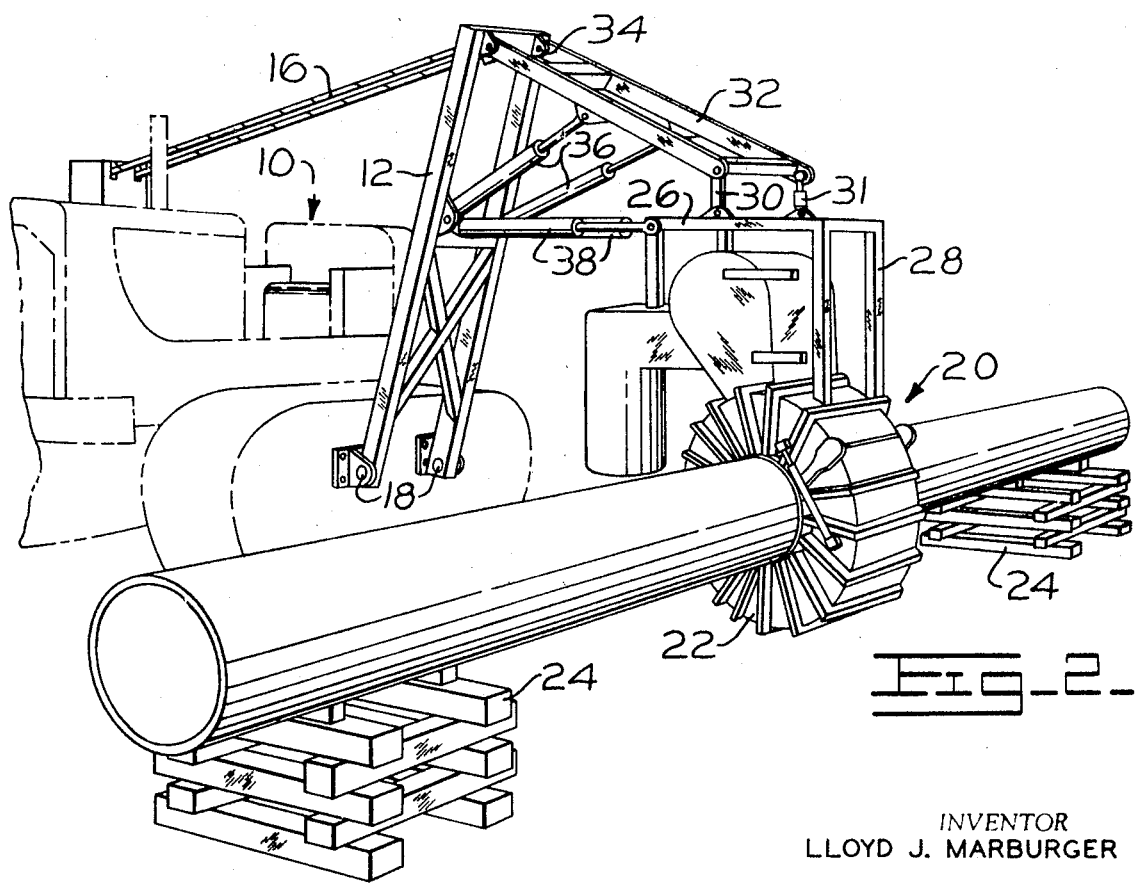
Fig_2_
INVENTOR
LLOYD J. MARBURGER
BY
Fryer, Zimmerwald, Tuit, Phillips & Lempio
ATTORNEYS

APPARATUS FOR SUPPORTING AND POSITIONING PIPE WELDERS

Of the several ways for connecting lengths of pipe to form a long pipeline, welding the joints has been the most satisfactory and widely used. However, the cost of hand welding on the site where a cross-country pipe is installed has proven quite high and has led to research pertaining to machines for producing a uniform high quality and low cost weld at the point of installation. Several welding machines have been devised for this purpose, perhaps the most desirable of which is an electron beam welder which comprises an annular welding chamber made of separable halves which may be positioned to encircle the pipe at the joint to be welded.

The present invention is related particularly to means for supporting and adjusting this welding chamber which is necessarily quite large and heavy for use in connection with large diameter piping customarily used in cross-country lines.

The invention includes the use of a tractor with a side-mounted boom supporting the frame which in turn supports the welding chamber. Pivoted links and adjustable means preferably in the form of hydraulic jacks extend between the boom and the frame and enable precise adjustment of the welding chamber after it has been moved into approximate position by manipulation of the boom on the tractor.

A further and more complete understanding of the invention will be gained from the following specification wherein reference is made to the accompanying drawing.

In the drawing:

FIG. 1 is a view in front elevation of tractor-mounted equipment embodying the present invention and illustrating a welding chamber in position at a pipe joint to be welded; and FIG. 2 is a perspective view of the same equipment that is shown in FIG. 1.

The drawing shows a tractor generally indicated at 10 with a boom 12 pivotably mounted at one side thereof and a counterweight 14 capable of being swung outwardly from the tractor to counterbalance the weight carried by the boom. Cables 16 extend between a suitable winch (not shown) on the tractor and the boom to raise and lower it about its pivotal connection with the tractor which is shown at 18.

All of this is conventional in machines known as pipelayers with the exception of the boom which, in the present case, is of more or less rectangular design rather than tapered toward its outer end as in conventional pipelayers.

In laying pipelines, it is customary to arrange lengths of pipe in end-to-end relationship alongside a ditch in which they are to be buried, then to weld them together and, with the aid of several pipelayers, each having a saddle suspended from its boom for embracing the pipe, lowering it gradually into the ditch as the tractors traverse its length.

It is present practice to weld together the abutting ends of the lengths of pipe, with a welding machine having an annular welding chamber, while the pipe is supported on temporary supports adjacent the ditch into which it is to be lowered. Such a welding chamber is generally indicated at 20 in the drawing and includes an annular portion 22 capable of being separated into two parts by hinge means, not shown, to enable it to be placed in position embracing the ends of the pipe to be welded. The pipe is illustrated as supported and aligned by temporary supports 24 made of short timbers or the like.

The entire welding chamber is supported by a frame comprising horizontal members 26 and vertical members 28 and this frame is supported by links 30 and 31 depending from a pivot from 32 which is pivoted as at 34 from the upper end of the boom 12. Power means which may be in the form of a pair of hydraulic jacks 36 extending between the boom approximately midway of its length and the links 30 and 31 which support frame 32 to raise and lower the frame with respect to the boom. Other power means in the form of jacks, one of which is shown at 38, extend between the boom and the frame which supports the welding chamber. One of the links which supports the frame, namely the link 31, is also an extensible element preferably in the form of a hydraulic jack.

Since the tractor 10 is capable of traveling parallel to the line of pipe lengths, supported as illustrated with their ends in abutting relationship, the boom 12 under control of the cable 16 and the frame 32 under control of the jack 36 are capable of lowering the welding chamber into embracing relationship with the pipe at the joint to be welded. Precise positioning including tipping and tilting of the welding chamber is accomplished by means of the jacks 38 and 31.

The support equipment for the welding chamber including an electric generator and other necessary components can be carried on a wheel or track-type trailerlike vehicle (not shown) towed by the tractor, and connected with the welding chamber by necessary cables and conduits. Circuits and control means (not shown) for directing hydraulic fluid under pressure to the several hydraulic jacks employed in adjusting the position of the welding chamber are of conventional type and the controls will be disposed for convenient manipulation by the operator of the tractor.

I claim:

1. A tractor support system for universally mounting a welding unit employed for end-joining pipe comprising:

a rectangular boom having its lower end pivotally mounted on one side of said tractor with its upper end swingable outwardly relative to said tractor;

adjustable means connected between said tractor and said boom for controlling its position relative to said tractor;

a rectangular frame having one end pivoted on said upper end of said boom;

hydraulic adjusting means connecting respectively central portions of said boom and said rectangular frame operable to positively control their relative angular relationship;

a welding unit support frame attached to a welding unit for end-joining pipe;

two spaced-apart suspension means connecting the opposite end of said rectangular support frame at spaced-apart locations with said welding unit support frame so the latter is suspended therefrom with at least one of said suspension means being adjustable to vary the distance between its associated side of said rectangular support frame and its associated side of said welding unit support frame; and two spaced-apart adjusting means connected between said central portion of said boom and an edge of said welding unit support frame whereby through independent adjustment of said several adjusting means the welding unit can be positively varied universally to achieve proper alignment with pipe pieces being end-welded in said welding unit.